Patented June 28, 1949

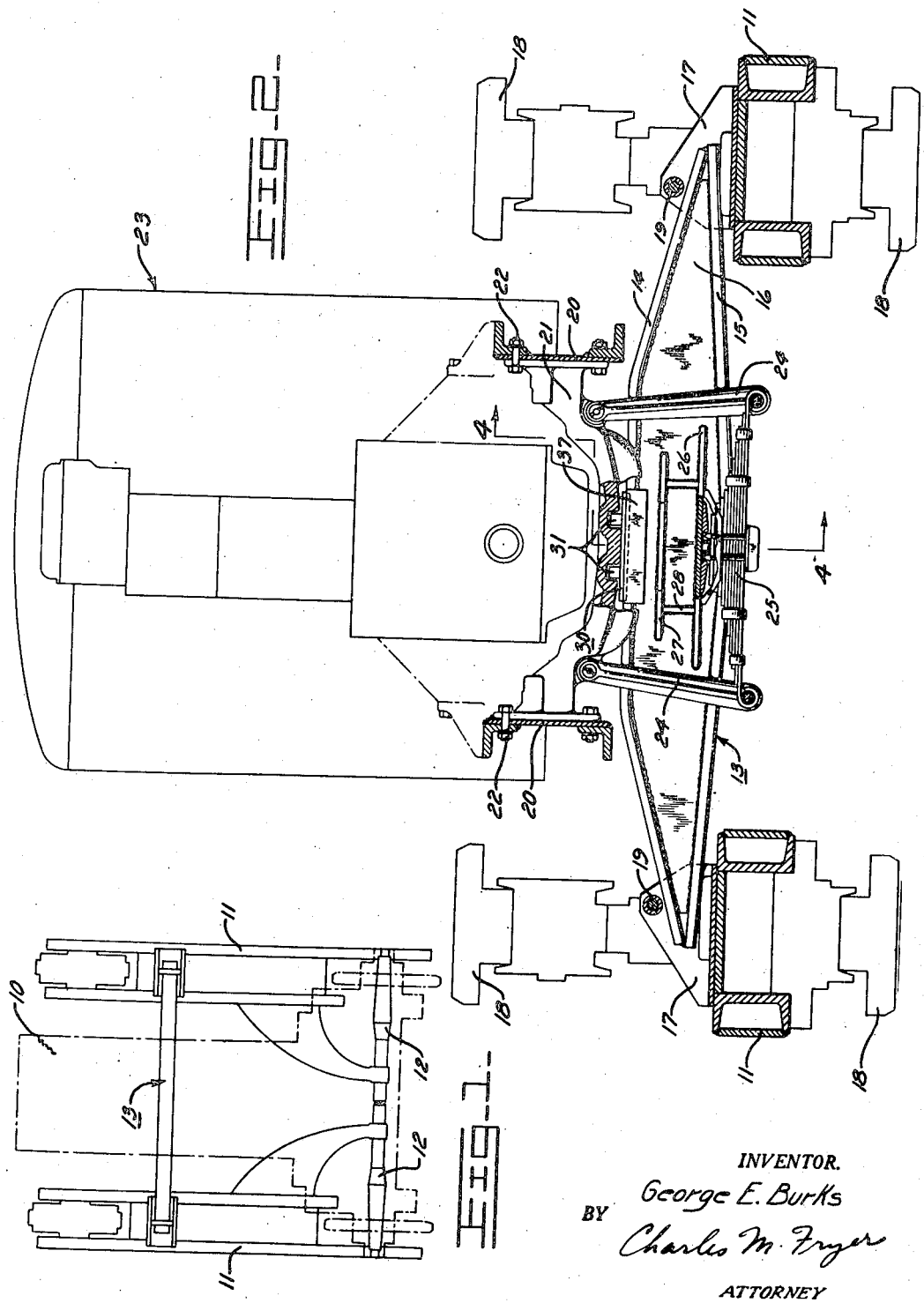

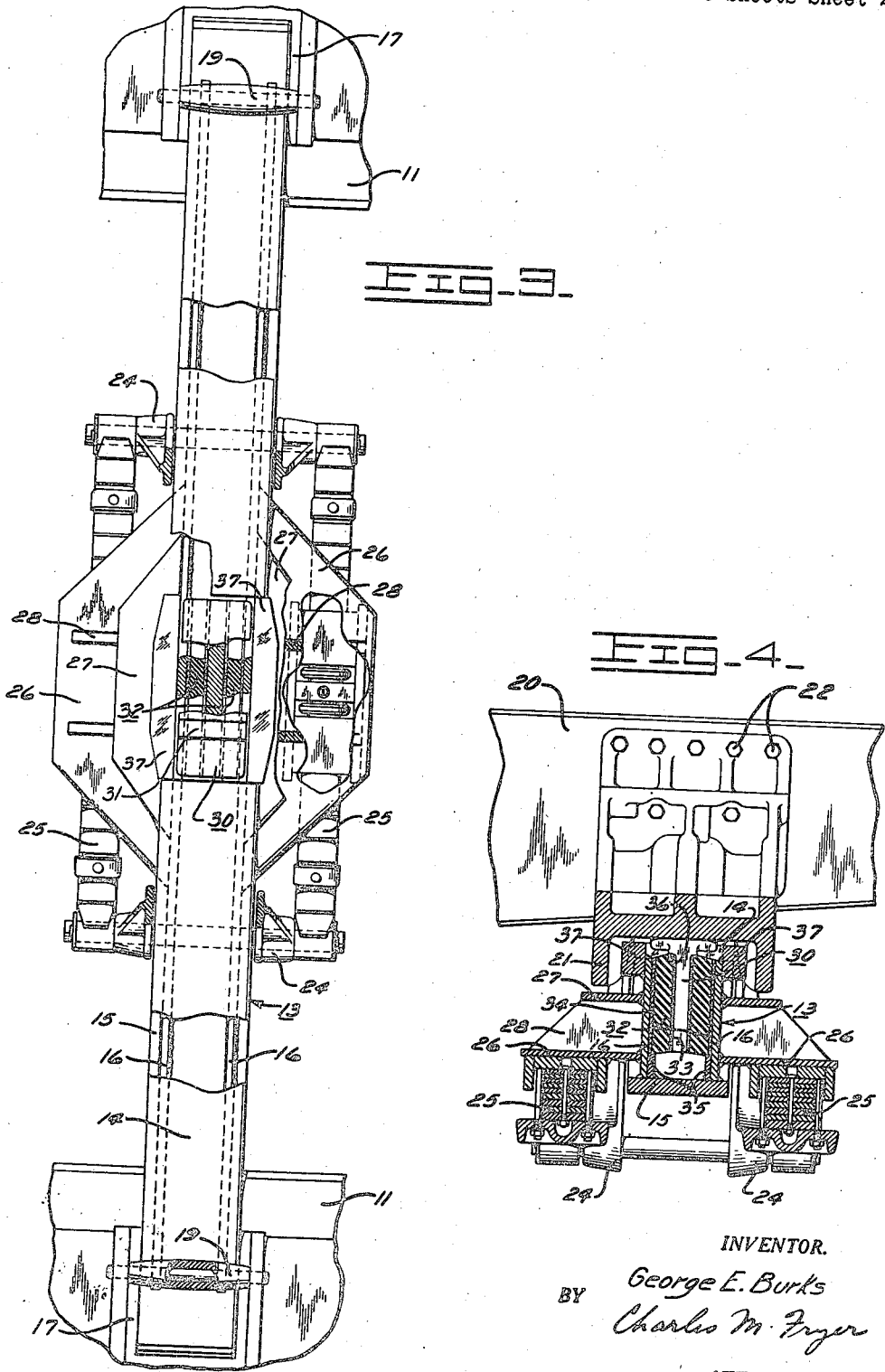

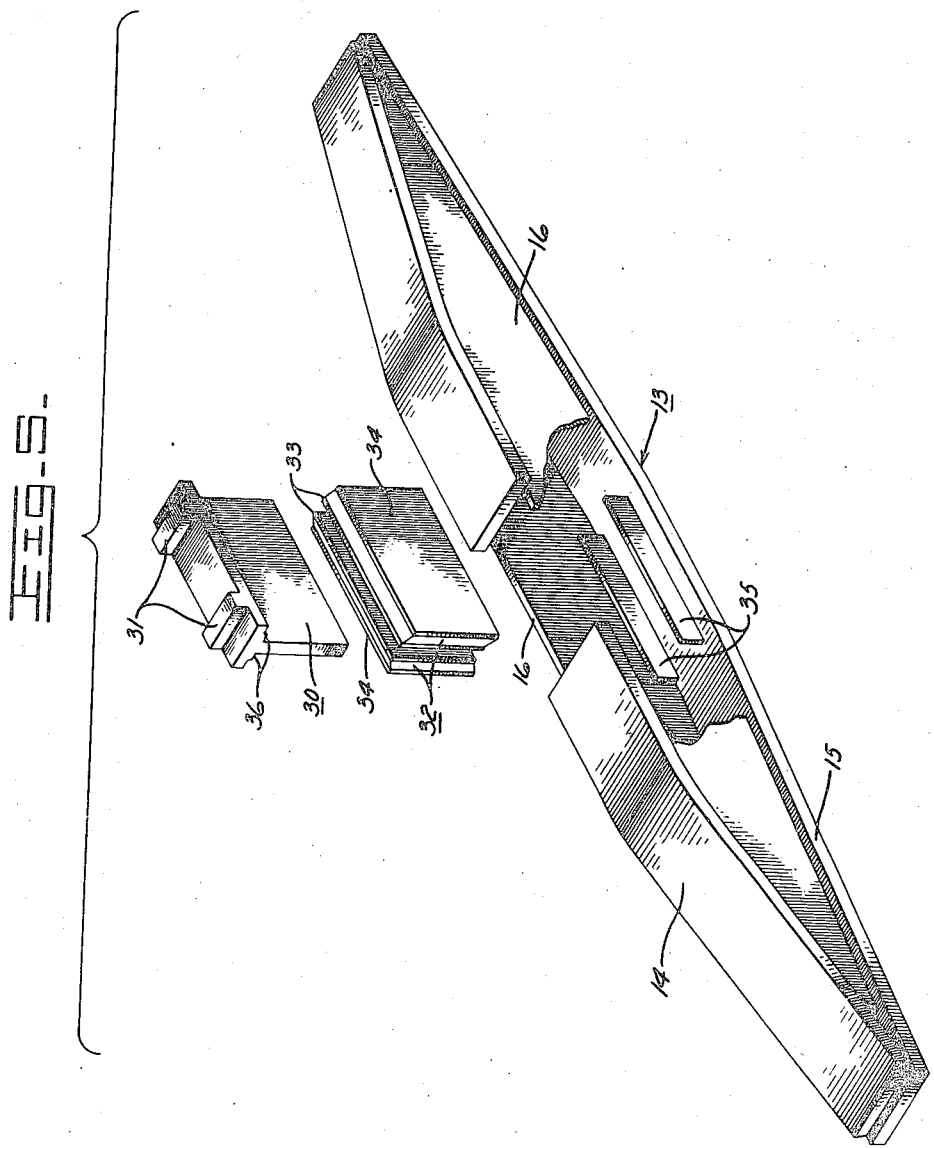

2,474,514

UNITED STATES PATENT OFFICE 2,474,514

VEHICLE SUSPENSION

George E. Burks, Peoria, Ill., assignor to Caterpillar Tractor Co., San Leandro, Calif., a corporation of California Application July 16, 1945, Serial No. 605,323

3 Claims. (Cl. 280—112)

The present invention relates to vehicle suspension and particularly to front end suspension of vehicles engaged in heavy service.

The invention is applicable to vehicles of many types but is herein disclosed in connection with its use on a track type tractor. This type of tractor comprises generally, a main frame supporting a power unit and transmission mechanism, and truck frames carrying endless tracks and disposed at opposite sides of the main frame. The truck frames are connected adjacent their rear ends to the main frame through sprocket shafts which carry sprockets for driving the endless tracks. This connection is non-resilient but permits the truck frames to pivot about the axis of the sprocket shafts so that the forward ends of the truck frames can swing upwardly independently of each other in traveling over obstacles or uneven terrain. Toward its forward end the main frame is supported on a transverse member extending between the truck frames. This transverse member is usually a spring which provides resilient suspension for the main frame and power plant and is also usually connected with the main frame and truck frames to permit limited rocking movement in the manner of an equalizer bar.

In large tractors the forward spring just referred to has of necessity been so large and stiff to enable it to carry the load and withstand heavy service that it has been ineffectual in cushioning the minor shocks of ordinary travel and use. Another disadvantage of the forward spring equalizer occurs in cases where the tractor is being employed as a bulldozer with a bulldozer blade operated from the forward end of its main frame. When the blade encounters an obstacle such as a stump or heavy rock and the operator attempts to raise the blade a vertical load is placed on the forward end of the main frame depressing the spring beyond its intended operating limit and often resulting in breakage which necessitates time consuming replacement of costly spring metal parts.

The present invention overcomes the disadvantages mentioned above by providing a front end suspension for vehicles which comprises a rigid equalizing bar of relatively inexpensive material and a resilient seat for the main frame disposed centrally of said bar. The resiliency of the seat is sufficient to provide adequate cushioning of all minor shocks such as might be encountered in ordinary travel and thus protects the power unit from constant shock and vibration. Definite limits are placed on the resilient action of the seat, however, so that heavy shocks or extreme vertical loads on the main frame are transmitted directly to the rigid equalizer bar and, through the truck frames which support it, to the ground.

It is therefore an object of the present invention to provide an improved suspension for vehicles and to provide a durable but inexpensive vehicle suspending means by which ordinary shocks are cushioned but wherein unusually heavy stock and load is transmitted through a rigid and substantially indestructible member. A further object of the invention resides in an unique and practical combination of a rigid equalizing member and a sensitive resilient means acting in conjunction therewith. Further and more specific objects and advantages of the invention are made apparent in the following specification wherein reference is made to the accompanying drawings which illustrate one form which the invention may assume.

In the drawings:

Fig. 1 is a diagrammatic view plan of a track type tractor showing the environment of the suspension means of the present invention as it is herein described;

Fig. 2 is a front elevation of an equalizer bar which embodies the present invention, with the main frame and truck frames of a tractor with which it is associated shown in section, and the outline of the principal parts of the tractor indicated in light lines;

Fig. 3 is a plan view of the equalizer bar shown in Fig. 2 with parts thereof broken away;

Fig. 4 is a vertical sectional view taken on the line 4—4 of Fig. 2; and

Fig. 5 is an exploded isometric view of the equalizer bar and parts contained thereby.

Referring first to Fig. 1 of the drawings the general outline of the main frame, power unit and transmission mechanism of the track type tractor is illustrated in broken lines at 10. Truck frames 11 are disposed on opposite sides of the main frame 10 for carrying the endless tracks by means of which the tractor is advanced over the ground. Adjacent the rear end of the tractor the truck frames and the main frame or power transmission mechanism carried thereby are pivotally connected by sprocket shafts 12 about which are rotated the sprockets which impart the driving movement to the endless track in a well known manner. This connection between the main frame and truck frames permits the forward ends of the truck frames to swing upwardly with relation to the main frame and independently of each other as the tractor advances over irregular terrain. The forward end of the main frame 10 which usually supports the power unit rides on the central portion of a transversely extending equalizing bar 13, the opposite ends of which are supported by the truck frame 11. It is to the structure of the equalizing member 13 and also particularly to the manner in which it supports the forward end of the main frame that the present invention is directed.

Referring to Figs. 2, 3 and 4, the equalizing bar generally indicated at 13 is shown as a rigid load supporting beam of hollow construction made up of top and bottom plates 14 and 15, respectively, and side plates 16, all suitably joined as by welding. At its opposite ends the equalizer bar 13 rests on saddles 17 which saddles are supported on the truck frames 11. The truck frames 11 are shown in Fig. 2 in their conventional association with the endless tracks 18 which are supported by them. Stop pins 19 on the saddles 17 limit the upward movement of the ends of the equalizer bar 13 relative to the truck frames. The main frame of the tractor is shown as comprising longitudinal side frame members 20 and a transverse frame member 21 secured to the side frame members as by bolts 22. The power unit generally indicated at 23 is supported on the main frame and the transverse member 21 of the main frame rests centrally of the equalizer bar 13 and is connected therewith by a resilient structure presently to be described in detail.

The main frame and equalizer bar are held against vertical separation by links 24 pivotally connected at their upper ends to the transverse frame member 21 and at their lower ends to the opposite ends of a pair of leaf springs 25. The springs 25 are, as best illustrated in Figs. 3 and 4, engaged beneath plates 26 which are secured to and extend horizontally from the front and rear sides of the equalizer bar 13. Smaller plates 27 and intermediate brackets 28 strengthen the plates 26 against distortion by the upward vertical load imposed upon them. The bottom surface of the transverse frame member 21 is curved downwardly as illustrated in Fig. 2 to permit the equalizer bar to rock relative to the main frame and against the tension of the leaf spring 25 which tends to hold it in a normal horizontal position.

With the construction thus far described, the equalizer bar 13 tends to limit the independent upward swinging movement of the forward end of either of the truck frames. When either truck frame swings upwardly the top plate of the equalizer bar engages and is stopped by the bottom edge of the longitudinal frame member 20 on the upwardly swinging side. Consequently, further upward movement of the same truck frame must be accompanied by raising of the opposite truck frame upon which the equalizer bar bears. At the same time the equalizer bar serves as a rigid load supporting member which carries the weight of the entire forward portion of the main frame and power unit supported thereby. The main frame is, however, resiliently connected with the equalizer bar through a cushioning structure which is principally contained within the bar and which is more clearly illustrated in Figs. 4 and 5.

This cushioning structure comprises a seat 30 which is generally T shaped in cross section and which has lugs 31 projecting upwardly from its upper surface for reception by recesses in the bottom of the transverse frame member 21 as best shown in Fig. 1. The registry of the lugs 31 with the recesses in the frame member prevents lateral displacement of the main frame but permits free rocking movement of the equalizer bar with relation to the main frame. A pair of cushion elements shown in Fig. 5 are provided for association with the seat 30 and each of said elements comprises a flat substantially rectangular section 32 of rubber or other similar resilient material, with a rigid metal plate 33 securely bonded to one of its faces and a similar plate 34 bonded to its other face. The bonding of rubber and metal in this manner is accomplished by a process well known to the art. The top plate 14 of the equalizer bar is centrally interrupted to provide an opening in the top of the bar through which the cushioning elements may be admitted and they are inserted in the bar with the lower edges of their plates 34 resting on spaced supports 35 welded in place against the bottom and side walls of the equalizing bar. The seat 30 is inserted between the opposed plates 33 of the cushion members 32 and is provided with shoulders 36 which rest upon the upper edges of said plates in the relationship shown in Fig. 4. Consequently, the vertical load of the main frame supported by the seat 30 is transmitted first to the inner plates 33 of the cushion members and then through their resilient elements to the outer plates 34 and to the rigid equalizer bar. With this construction the resilient portions of the cushion elements are stretched rather than compressed by the load which they support. This is an advantage because most inherently resilient materials, such as rubber and the like, react more satisfactorily and are longer lived under deformation by stretching than under comparable deformation by compression. The resilient action of the main frame with relation to the equalizer bar is limited by abutment bars or stops 37 which are shown in Figs. 3 and 4 as welded to opposite sides of the equalizer bar in a position to be engaged by the transverse frame member 21 when it is depressed a certain distance.

Through the construction described the forward end of the tractor is resiliently supported during normal operation by a cushioning structure which is substantially entirely enclosed and protected by a rigid equalizer bar. When the vertical shock or load exceeds a predetermined value it is transmitted directly to the rigid and sturdy structure of the equalizer bar without possibility of applying undue stresses to the cushioning mechanism.

I claim:
1. In a track type tractor having a main frame and truck frames disposed at opposite sides thereof, a suspension structure comprising a rigid equalizer bar underlying the main frame and supported at its opposite ends on the truck frames, said equalizer bar having a bottom plate and vertically disposed spaced side plates, and a resilient support for the main frame comprising a T shaped seat member having a portion extending downwardly into the equalizer bar, and resilient means interposed between said portion and the side plates of the bar.

2. In a track type tractor having a main frame and truck frames disposed at opposite sides thereof, a rigid transverse supporting member extending between and resting directly on the truck frames, and resilient load bearing means carried and substantially enclosed by said supporting member and means limiting the resilient action of said load bearing means whereby excessive loads will be transmitted directly through the rigid supporting member.

3. In a track type tractor having a main frame and truck frames disposed at opposite sides thereof, a rigid transverse supporting member extending between and resting directly on the truck frames, and resilient load bearing means carried thereby and comprising a pair of vertically disposed relatively flat members of inherently resilient material, a load supporting member interposed between said members and bearing upon their opposed inner faces, and means for supporting said members from their outer faces.

GEORGE E. BURKS.

REFERENCES CITED

The following references are of record in the file of this patent:

UNITED STATES PATENTS

| Number | Name | Date |
|---|---|---|
| 1,155,801 | Dearing | Oct. 5, 1915 |
| 1,425,687 | Penton | Aug. 15, 1922 |
| 2,099,031 | Neal et al. | Nov. 16, 1937 |
| 2,202,615 | Barenyi | May 28, 1940 |
| 2,217,818 | Ronning | Oct. 15, 1940 |

FOREIGN PATENTS

| Number | Country | Date |
|---|---|---|
| 492,517 | Great Britain | Sept. 21, 1938 |
| 828,739 | France | Feb. 28, 1938 |